Aug. 24, 1954

J. H. WILLIAMS 2,686,945

MOLD MAKING MACHINE WITH ROLLOVER DEVICE

Filed Feb. 4, 1953

INVENTOR.
JAMES HOWARD WILLIAMS
BY
David D. McKenney
ATTORNEY

INVENTOR.
JAMES HOWARD WILLIAMS

INVENTOR.
JAMES HOWARD WILLIAMS
BY
*David D. McKinney*
ATTORNEY

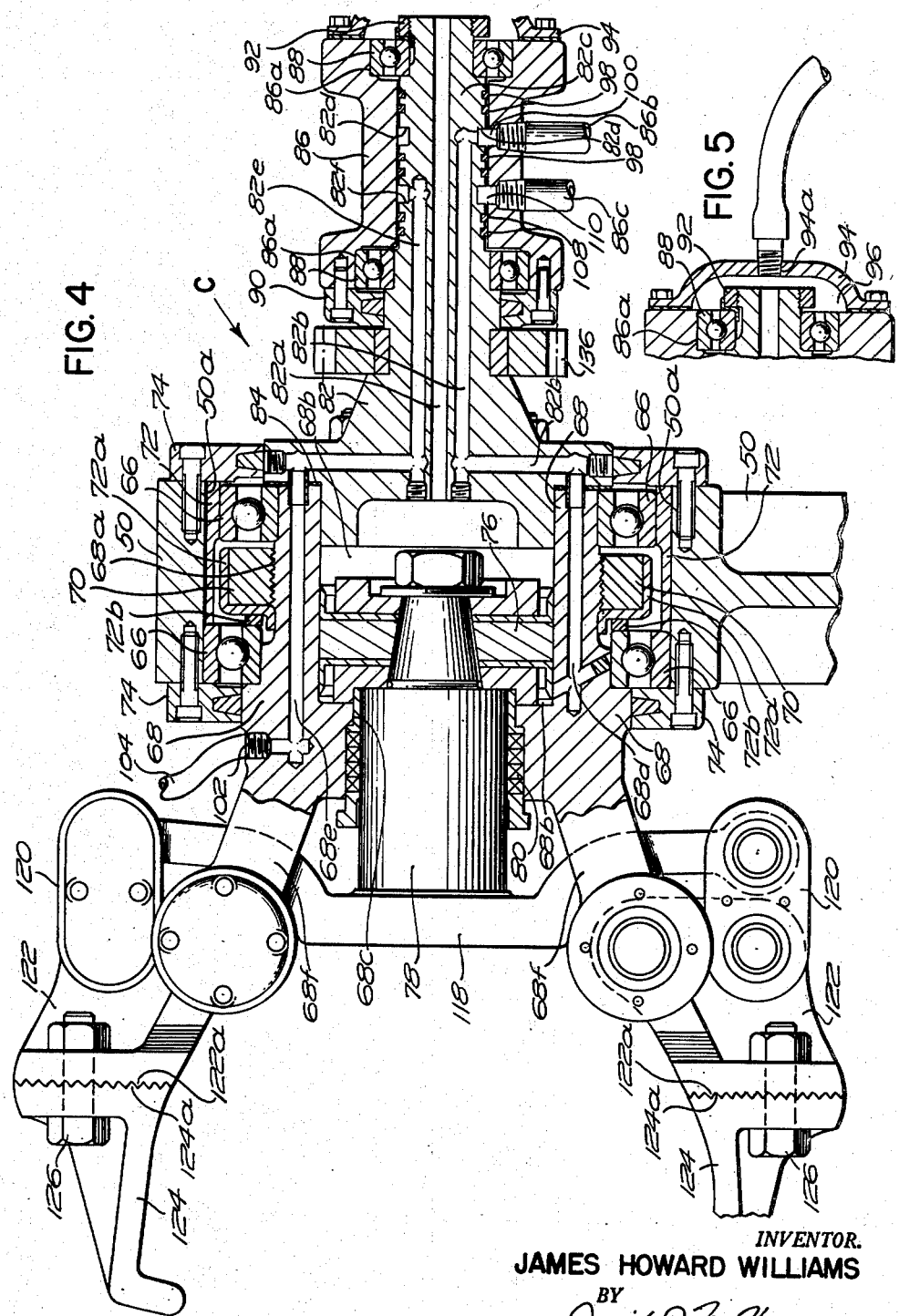

Aug. 24, 1954 J. H. WILLIAMS 2,686,945
MOLD MAKING MACHINE WITH ROLLOVER DEVICE
Filed Feb. 4, 1953 9 Sheets-Sheet 5

INVENTOR.
JAMES HOWARD WILLIAMS
BY
David D. McKenney
ATTORNEY

INVENTOR.
JAMES HOWARD WILLIAMS
BY
ATTORNEY

Aug. 24, 1954 J. H. WILLIAMS 2,686,945
MOLD MAKING MACHINE WITH ROLLOVER DEVICE
Filed Feb. 4, 1953 9 Sheets-Sheet 7

*INVENTOR.*
JAMES HOWARD WILLIAMS
BY
David D. McKinney
ATTORNEY

INVENTOR.
JAMES HOWARD WILLIAMS

Patented Aug. 24, 1954

2,686,945

UNITED STATES PATENT OFFICE 2,686,945

MOLD MAKING MACHINE WITH ROLLOVER DEVICE

James Howard Williams, Lincoln, R. I., assignor to Grinnell Corporation, Providence, R. I., a corporation of Delaware Application February 4, 1953, Serial No. 335,087

5 Claims. (Cl. 22—32)

This invention relates in general to improvements in the art of making molds. More particularly it has to do with improved mold making machines with rollover device for producing molds of sand or the like which are semi-automatic in operation and which are especially adapted for making molds with a match plate having the drag pattern on one of its sides and the cope pattern on the other.

The old match plate method of producing sand molds, and, as far as I am aware, the match plate method still most widely practiced in industry, has a serious disadvantage in that it requires considerable handling of heavy sand-filled flasks on the part of the workman. Machines were early devised for properly squeezing the sand in the flasks, but when the most efficient use is made of these machines the assembled flasks and the match plate resting thereon must be turned over after each squeeze at which time both flasks are filled with sand and are very heavy.

From time to time other mold making machines have been proposed which tend to minimize the amount of handling required of the workman by automatically turning over the assembly of flasks and match plate after performing the squeeze. Some of these machines have been used commercially for a number of years with moderate success, but all those that have come to my attention are so constructed that they must be provided with specially designed cope flasks, drag flasks and match plates for use therewith. For the most part however, the match plates and flasks now employed in the old match plate method represent a considerable investment, and there is an understandable reluctance in industry to replace these items as well as the machines with which they have so long been used.

It is an object of the present invention to provide a mold making machine, adapted to the match plate method of molding, in the operation of which no special flasks or match plates are necessary, equipment of this sort which has long been used in the predominantly manual method being accommodated by my novel machine.

Another object of my invention is to provide a mold making machine which has the usual squeeze mechanism and in addition has a mechanism for turning over the mold, as required, during its preparation, thus reducing the amount of lifting and handling required of the operator.

Still another object is to provide a machine of the above described type in which the roll-over mechanism grips the "squeeze-boards" as the mold is turned over, making unnecessary special clamps or other means of securing together the assembly of flasks and match plate.

Yet another object of my invention is to provide in my novel mold making machine an electrical control system so arranged that maximum number of machine operations follow each other automatically, thus reducing the number of levers or switches and requiring less attention on the part of the operator to see that the proper sequence is followed.

And finally it is an object to provide a machine part of which may be easily removed for maintenance and repair.

The best mode in which I have contemplated applying the principles of my improvements is shown in the accompanying drawings, but these are to be deemed merely illustrative for it is intended that the patent shall cover by suitable expression in the appended claims whatever features of patentable novelty reside in the invention disclosed.

In the drawings:

Figure 4 is a front elevation view of the upper end of one of the clamping legs of the roll-over mechanism and the clamping head associated therewith, portions of these elements being shown in cross section;

Figure 5 is a detail of the roll-over mechanism not shown in Fig. 4;

Figure 1:
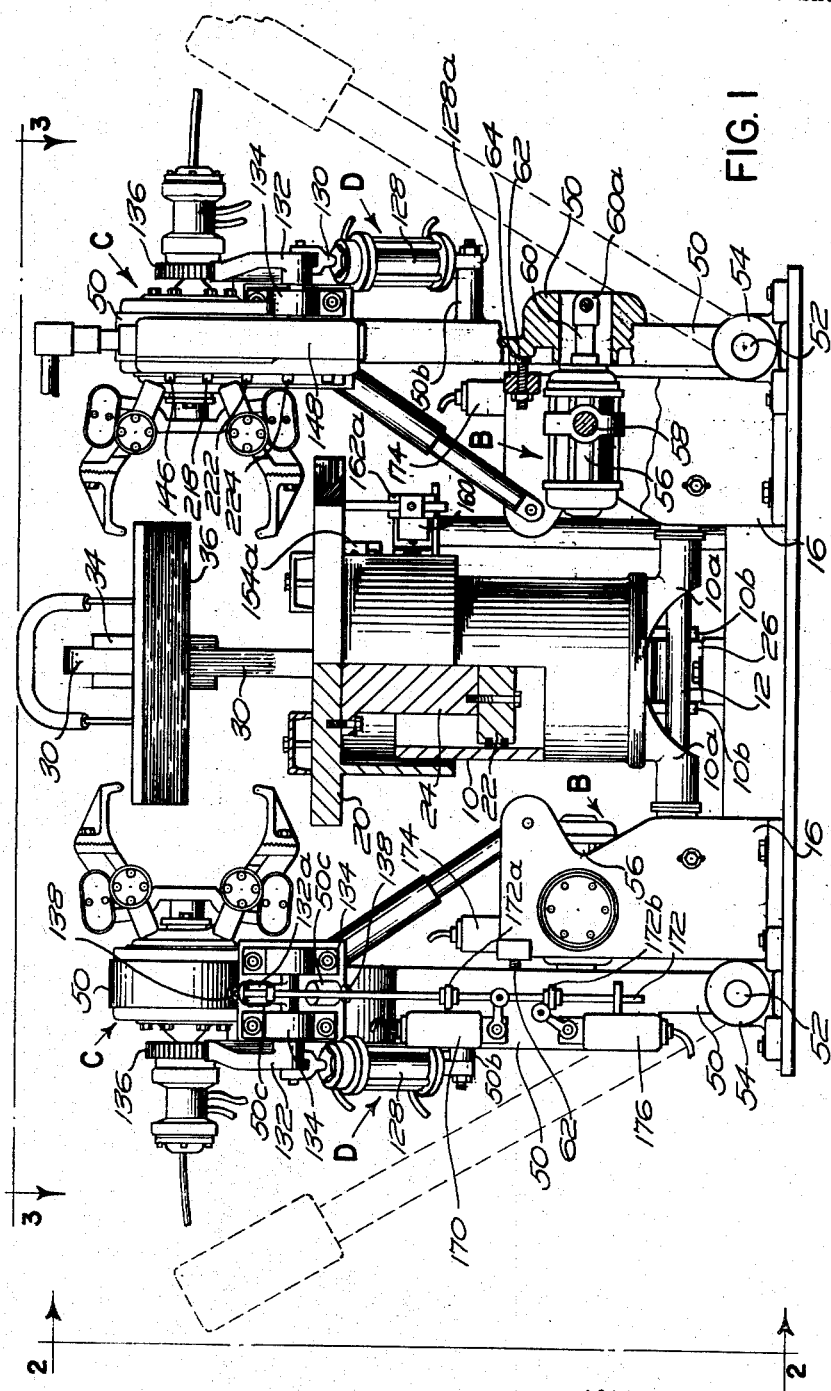
Figure 1 is a front elevation view of my improved mold making machine with portions shown in section.
Figure 2:
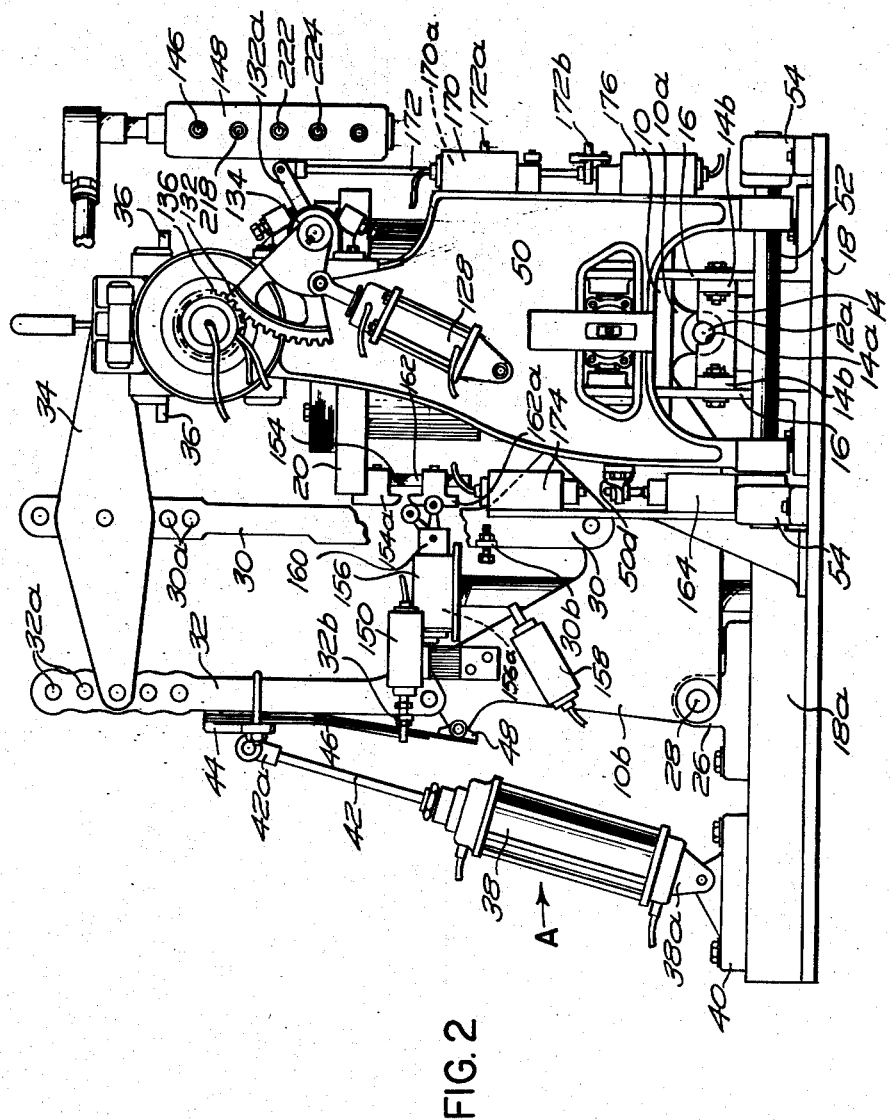
Figure 2 is a side elevation view of the machine taken as on line 2—2 of Figure 1.
Figure 3:
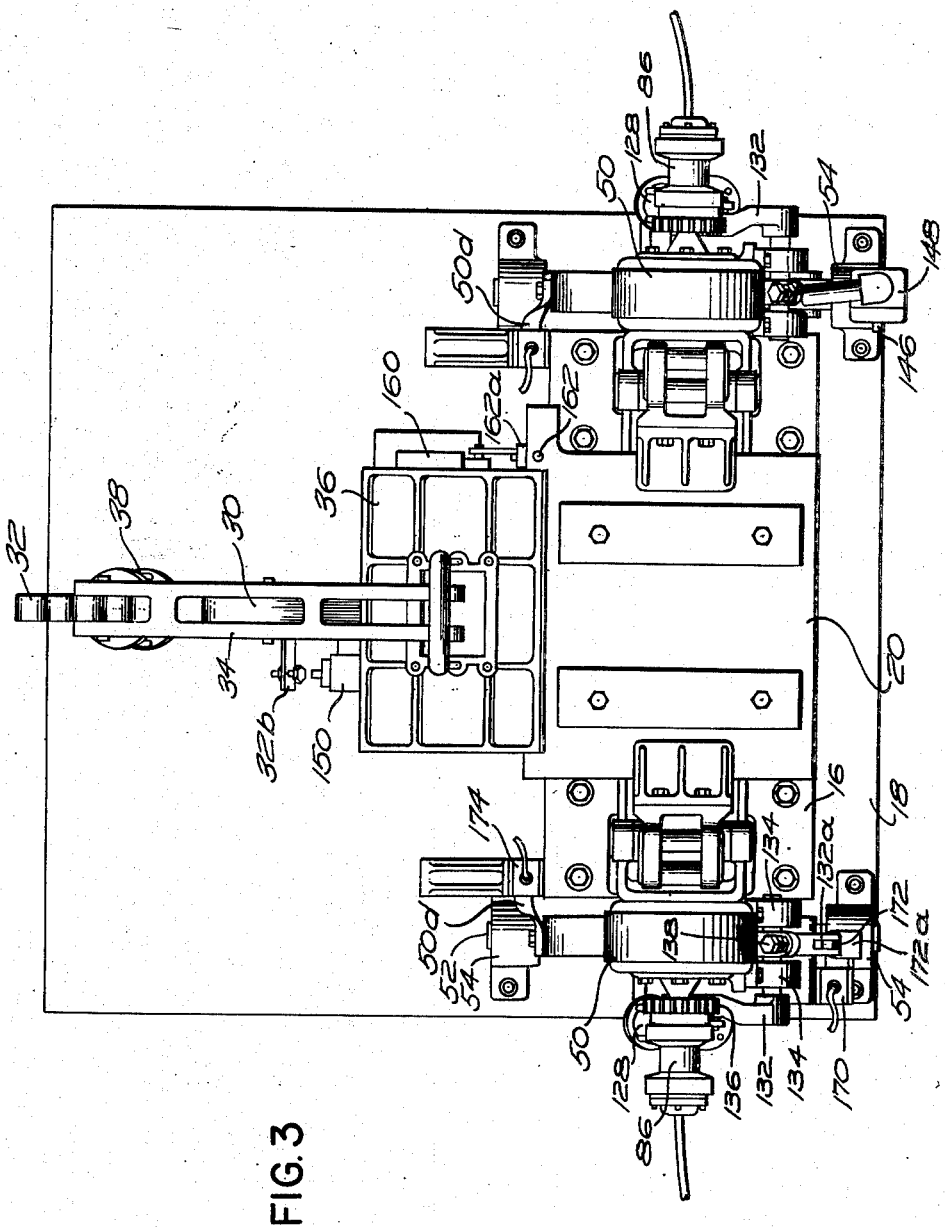
Figure 3 is a plan view of the machine taken as on line 3—3 of Figure 1.

Referring now more particularly to the drawings, the general assembly of my improved machine is best shown in Figs. 1, 2 and 3. In its preferred embodiment this machine comprises a portable molding machine of the conventional type having a fluid pressure operated squeeze mechanism and a manually positionable head in the usual form, but which is mounted on a fixed base, the wheels having been removed for that purpose, and with which there is associated mechanism for turning over the molds being prepared. More specifically the SPO No. 110J Portable Jolt Squeeze Molding Machine made by SPO, Incorporated, of Cleveland, Ohio, is well adapted for use in the present improved machine, though it will be understood that other squeeze mechanisms which operate in the same general way may be used.

As shown in the drawings the squeeze mechanism includes a squeeze cylinder 10 disposed with its axis vertical and provided at its underside with short depending legs 10a which serve as bearings for a horizontal axle 12, the ends 12a of which project from either side of the cylinder 10 and are customarily fitted with wheels. In the present invention, however, these wheels have been removed and the ends 12a of the axle 12 are supported in semi-circular open journals 14a formed in supporting plates 14 (see Fig. 2). These supporting plates are arranged generally perpendicular to the axis of the axle 12 and have end flanges 14b bolted or otherwise secured to upstanding brackets 16 which are in turn suitably fastened to a base plate 18 resting on the floor. A table 20 is located across the upper end of the squeeze cylinder and connected to a piston 22 therein by a piston rod 24. This table is moved upward by introducing fluid pressure into the cylinder below the piston. The weight of the table is sufficient to bring it down again when the fluid pressure is exhausted from below the piston.

Integrally formed with the squeeze cylinder 10 at the back thereof and extending rearwardly therefrom is a frame member 10b, bifurcated at its lower end to accommodate a third wheel which has been removed in the present invention and a bearing bracket 26 substituted therefor. This bearing bracket is secured in a convenient manner to a raised portion 18a of the base plate 18 and carries a short axle 28 on the ends of which the bifurcated portions of the frame member 10b are mounted. Elsewhere on this frame member 10b there are pivotally secured the lower ends of two upstanding arms 30 and 32 which comprise parts of a squeeze-head linkage, the upper ends of these arms being pivotally secured to a squeeze-head cross bar 34, substantially as shown. A squeeze-head 36 is fixed to the cross bar 34 at the end thereof nearest the squeeze-cylinder 10, the linkage as a whole being arranged so that the squeeze-head 36 may be swung forward to a position directly above the table 20 as shown in Fig. 2 or swung back a predetermined distance to the position illustrated in Figs. 1 and 3. A series of pivot holes 30a at the upper end of arm 30 and a corresponding series of holes 32a at the upper end of arm 32 provide for adjustment of the distance between the movable table 20 and the squeeze-head 36 making possible the use of a wide range of flask sizes, as will be more fully understood. Thus, in the operation of the machine sand in the flasks placed on tables 20 is properly squeezed by raising the table when the squeeze-head 36 is in its forward position above the table. Because of the adjustability of the squeeze-head, made possible by the series of pivot holes 30a and 32a, flasks of substantially different depths may be employed.

Movement of the squeeze-head 36 to and from its forward position above table 20 is achieved by a fluid pressure actuated piston-cylinder unit A the cylinder 38 of which has one of its ends 38a pivotally mounted on the raised portion 18a of the base plate 18 by means of a bracket 40 secured to this portion behind the bearing bracket 26. A piston rod 42 fixed to a piston within the cylinder 38 and projecting from the other end thereof has its end 42a pivotally secured to one of the upstanding arms 32 of the squeeze-head linkage by another bracket 44. This bracket 44 also serves to clamp against the arm 32 one end of a leaf spring 46 the other end of which bears against a self-aligning plate 48 mounted on the fixed frame member 10b as shown. This leaf spring tends to urge the squeeze-head 36 into this forward position above the table 20, thus aiding the piston cylinder unit A into overcoming gravity since the linkage is so arranged that the squeeze-head swings upward as well as forward from its rearmost position. The extent of swing of the squeeze-head 36 is limited by the stroke of the piston in the cylinder 38.

On either side of the squeeze cylinder 10 there is located a clamping leg 50 pivotally mounted on a horizontal axle 52 which is supported by bearings 54 secured to the base plate 18 and which is so disposed that the clamping leg 50 pivoted thereon swings toward and away from the table 20. Swinging movement of these clamping legs is achieved by two additional fluid pressure actuated piston-cylinder units B, the cylinders 56 of which are pivotally mounted on horizontal trunnions 58 between the pairs of upstanding brackets 16 located on either side of the squeeze cylinder 10. Piston rods 60 fixed to pistons within these cylinders 56 have their ends 60a pivotally secured to the clamping legs 50 substantially as shown. The simultaneous introduction of fluid pressure into the two cylinders 56 on corresponding sides of the pistons therein causes the clamping legs 50 to swing in or out as the case may be.

These clamping legs 50 comprise the supports for what may be termed roll-over clamping heads C located in their upper ends. Each of these roll-over clamping heads has associated therewith, in a manner which will be more particularly described, a pair of rotatable jaws adapted to grip the flasks, when the table 20 has been raised the proper distance, and turn over the flasks, when the table is again lowered. During this part of the machine's operation, that is, when the flasks are being rolled over, the clamping legs are moved to a substantially vertical position as shown by the solid lines in Fig. 1. For the remainder of the machine cycle the clamping legs are swung back to the position shown by the dotted lines in Fig. 1 and out of the way of the operator working on the flasks on the table 20. The extent of outward swing of each clamping leg 50 is limited by the stroke of the piston within cylinder 56, and the extent of inward swing of each clamping leg is limited by an adjustable bolt 62 which is threaded in a cross bar 64 secured across the upstanding brackets 16 and against the end of which the clamping leg comes to rest.

Formed in the upper end of each of the clamping legs 50 is a large circular hole 50a (see Fig. 4) whose axis is horizontal and coincides with the axis of the corresponding hole in the clamping leg on the other side of the table when these legs are in vertical positions. Each of these holes 50a is provided with two ball bearing units 66 in the usual manner and serves as a journal in which the roll-over clamping head C is mounted. More particularly each of these roll-over clamping heads comprises a cylindrical body 68 which fits nicely within the ball bearing units 66. In its preferred form this cylindrical body is externally threaded at 68a, the portion adjacent the center of the clamping leg hole 50a, to receive an internally threaded annular ring 70. When installed in the clamping leg hole 50a with suitable filler washers 72, 72a and 72b the roll-over clamping head C is prevented from moving axially by this annular ring 70 which is confined on either side by the ball bearing units 66, and these two ball bearing units are in turn prevented from moving laterally by two annular dust covers 74 bolted to the clamping leg at either end of the hole 50a.

The cylindrical body 68 of the roll-over clamping head C has a central passage 68b of large diameter partway therethrough in which a piston 76 is nicely fitted. A smaller central passage 68c through the end wall of the cylindrical body accommodates a piston rod 78 which is fixed to the piston 76 and which actuates the rotatable jaws. The piston rod passage 68c is provided with the usual packing gland 80 to prevent leakage of fluid pressure around the piston rod. The other end of the cylindrical body 68 opposite the piston rod passage 68c is sealed by a plug 82 bolted to the periphery of the cylindrical body with a suitable sealing gasket 84 interposed in the usual manner thus causing the central passage 68b to become a pressure tight chamber. Fluid pressure is admitted to this chamber on one side of the piston 76 through a duct 82a centrally located in the plug 82, and fluid pressure is admitted on the other side of the piston through another duct 82b in the plug which joins a duct 68d in the side wall of the cylindrical body 68.

During one complete machine cycle the rollover clamping head C rotates 180° in one direction and then in the next machine cycle rotates back again 180° in the opposite direction, and so on. Consequently, it is necessary to provide means for admitting fluid pressure to the ducts 82a and 82b in the rotating plug 82 from fixed supply pipes. This could be done by using rubber hose connections or other flexible leads joined to these ducts in plug 82 and free to rotate therewith, but the structure shown is preferred because the leads from the fixed supply pipes do not rotate and as a result there is no danger of their becoming entangled. To accomplish this preferred result the plug 82 has extending from it along the axis of the roll-over clamping head C a cylindrical shaft portion 82c on the outer end of which is rotatably mounted a spool 86. This spool has ball bearing units 88 located in recesses 86a at both ends thereof to permit free turning of the plug shaft 82c with respect thereto. An annular dust cover 90 bolted to the end of the spool nearest the clamping leg 50 confines the ball bearing unit 88 located therein in its recess 86a, and at the other end of the spool the other ball bearing unit 88 is confined in its recess by a nut 92 which is threaded onto the end of the plug shaft 82c and which also serves to prevent the spool 86 from moving axially thereon. A flanged cup 94 (see Fig. 5) is bolted to the end of the spool 86 across the end of the plug shaft thus forming a pressuretight chamber 96 into which fluid pressure is introduced through a connection 94a in the flanged cup. From this chamber 96 fluid pressure enters the duct 82a extending along the plug shaft 82c and is led to chamber 68b on one side of the piston 76 to move the piston in one direction.

To move the piston in the other direction fluid pressure must enter duct 82b. This duct also extends along the plug shaft 82c but near the outer end thereof turns and opens into an annular groove 82d which is enclosed by the body of the spool 86 and made tight by sealing rings 98 forming a pressure chamber 100. Fluid pressure is brought to this pressure chamber through a connection 86b in the side wall of the spool 86 opposite the groove 82d. No matter how the plug shaft 82c turns within the spool 86 fluid pressure admitted to pressure chamber 96 can enter duct 82a, and likewise fluid pressure admitted to chamber 100 can always enter duct 82b.

In one of the two roll-over clamping heads a third duct 82e is located in the plug 82 and joins a second duct 82e in the sidewall of the cylindrical body 68. Unlike duct 68d, however, this duct 68e does not enter the chamber 68b but emerges from the cylindrical body near the rotatable jaws and is provided at this point with a fluid pressure connection 102 for a short length of flexible hose 104. The other end of this flexible hose has connected to it an air vibrator 106 (see Fig. 6) whose function will be explained presently. The duct 82e extends along the plug shaft 82c and enters a groove 82f in the side thereof adjacent the groove 82d. This groove 82f is also enclosed by the body of the spool 86 and made tight by sealing rings 108 forming a pressure chamber 110. Fluid pressure is brought to this pressure chamber through a connection 86c in the side wall of the spool 86.

The air vibrator 106 is bolted to the match plate 112 (see Fig. 6) located between flasks 114 and 116 and is turned on at the end of a machine cycle when the operator lifts a finished flask from the match plate. The vibration it provides prevents the sand in the flask from sticking to the contours of the match plate. However, during each machine cycle the match plate 112 is turned over 180° and with it the vibrator 106. The flexible hose 104 bringing fluid pressure to this vibrator would become entangled with the jaws if it were connected directly to a fixed fluid pressure supply pipe, but by the improved arrangement the flexible hose 104 rotates with the match plate and cannot become entangled or twisted.

Referring again to Fig. 4, the force exerted by fluid pressure in chamber 68b moves a thrust lever 118 secured across the end of piston rod 78 and arranged substantially parallel to the clamping leg 50. This thrust lever has pivotally secured to its ends identical short links 120, the other ends of which are pivotally secured to clamping jaw holders 122. These clamping jaw holders are themselves pivoted to projections 68f formed on the cylindrical body 68, substantially as shown, and are provided with adjustment teeth 122a to mesh with corresponding teeth 124a on the rotatable jaws 124 bolted to the clamping jaw holders by bolts 126. With this provision of teeth on the jaws and jaw holders the distance between the clamping jaws may be adjusted to accommodate different flask sizes by loosening the bolts 126, moving the rotatable jaws to a new position on the clamping jaw holders and then tightening these bolts until the teeth 122a and 124a are again meshed. The jaw linkage as a whole is so arranged that movement of thrust lever 118 in one direction spreads the rotatable jaws 124 apart, and movement in the opposite direction closes the rotatable jaws.

Rotation of each roll-over clamping head C in its hole 50a is achieved by a fluid pressure actuated piston-cylinder unit D (see Figs. 1 and 2), the cylinder 128 of which is pivotally secured at one end 128a to a projection 50b extending outward from the side of the clamping leg 50. A piston rod 130 is fixed to a piston within this cylinder 128 and has its end pivotally secured to a segment gear 132 which is in turn pivotally mounted in bearings 134 bolted to the clamping leg so that the segment gear can engage a pinion gear 136 keyed to the plug 82 behind spool 86. Movement of the piston rod 130 turns the segment gear 132 which rotates the pinion gear 136 and thereby rotates the roll-over clamping head C in the clamping leg hole 50a. Consequently, the rotatable jaws 124 rotate and turn over the flasks gripped between them.

During the roll-over operation of the machine it is necessary to achieve a rotation of the roll-over clamping head C of exactly 180° and this is accomplished by means of adjustable stop bolts 138 mounted in projections 50c formed on each clamping leg 50. These bolts are so disposed with respect to the segment gear 132 that a hub 132a thereon strikes against the end of one of these bolts at either end of its swing. Proper adjustment of the bolts 138 in their projections 50c will limit the rotation of the roll-over clamping head C to exactly 180° and properly fix the position of the rotatable jaws at the end of their travel.

Referring now more particularly to Figs. 7 to 15, the sequence of steps involved in the production of a sand mold using my improved machine is as follows: First the operator puts an empty cope flask 116 upside down on table 20. Next he places the match plate 112 across the cope flask and puts an empty drag flask 114 on this match plate. Aligning pins 116a fixed to the ends of the cope flask fit into suitable holes 112a and 114a in the ends of match plate and drag flask, respectively, and serve to keep these parts of the assembly in proper alignment (see Fig. 6). The operator then fills the empty drag flask 114 with sand 140 from an overhead hopper (not shown) and with a suitable tool (for instance, a shovel handle) tamps the sand until it is packed firmly. Next the operator levels off the packed sand until it is flush with the edges of the drag flask 114 and places a squeeze-board 142 on the sand. This squeeze-board fits just inside the edges of the flask. Then the operator turns the entire assembly over by hand so that the sand-filled drag flask 114 is resting on its squeeze-board 142 on the table 20 and the empty cope flask 116 is uppermost. See Fig. 7.

Figure 6:
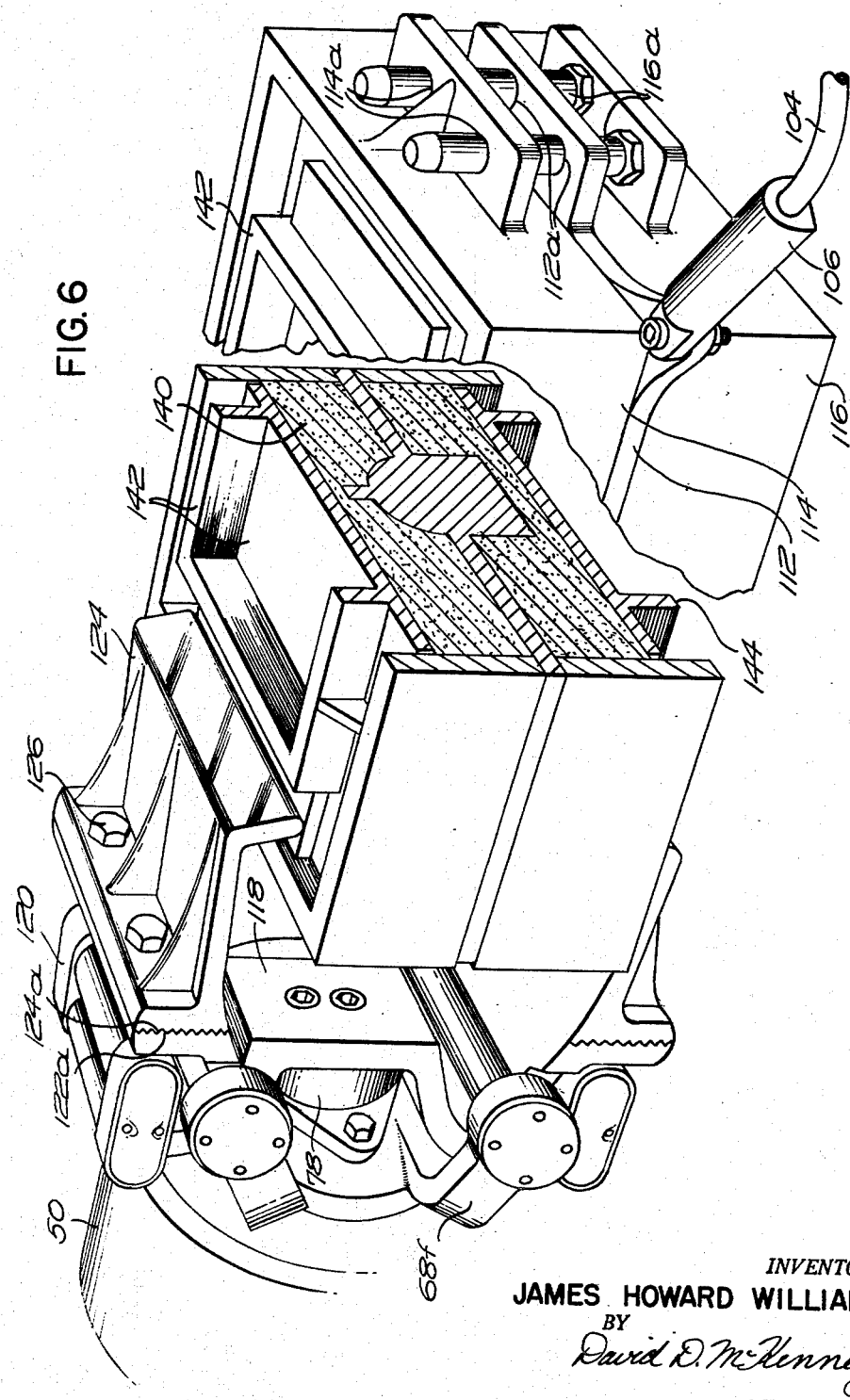
Figure 6 is a perspective view showing how the clamping jaws grip the mold during the roll-over operation. Portions of the flasks are cut away to show the assembly of flasks and match plate.
Figure 7:
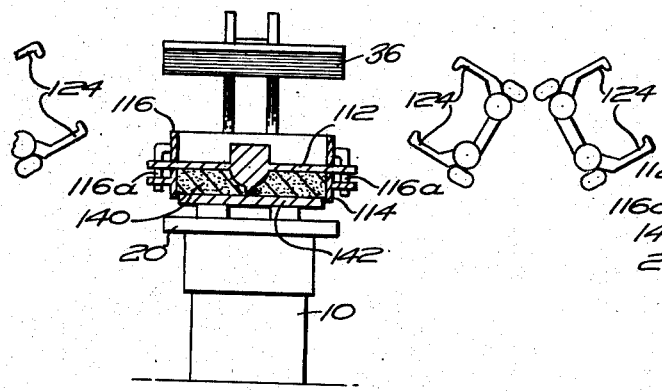
Figure 7 is a diagram showing a cope flask, drag flask and match plate assembled on the table. The drag flask is filled with sand and lowermost, having been prepared and turned over on the table by the operator.
Figure 10:
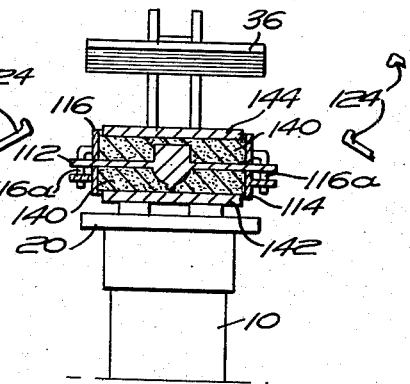
Figure 10 is a diagram showing the table lowered and the squeeze top swung back.

It is necessary to hand-tamp this first drag and turn the assembly over by hand for two reasons: First of all the sand in the drag flask cannot be squeezed by the machine because there is no sand in the cope flask below, and consequently there is a danger that the match plate 112 might be bent by the force of a machine squeeze. Secondly, the rotatable jaws 124, which grip the assembly of flasks and match plate during the machine roll over, are arranged to engage the squeeze-board 142 and a corresponding squeeze-board 144, as illustrated in Fig. 6, and no squeeze-board can be put in place in the cope flask 116 because this flask is empty.

Having turned the flasks over by hand, as indicated, the operator then fills the empty cope flask 116 with sand from the hopper, levels off the sand and places the squeeze-board 144 thereon. See Fig. 8.

Next the operator pushes a squeeze-roll button 146 on a control panel 148 of the electrical system and the following operations take place. Pushing this button initially causes fluid pressure to be admitted to cylinder 38 swinging the squeeze head 36 to its "forward" position above the assembly of flasks and match plate on the table 20. At the end of the forward movement of the squeeze-head a projection 32b on the upstanding arm 32 of the squeeze-head linkage trips a head-forward limit switch 150 suitably mounted on frame member 10b. (The various limit switches herein referred to are shown in Figs. 1, 2 and 3.) As a result of this switch being tripped the electrical control circuit causes fluid pressure to be admitted to the squeeze-cylinder 10 whereupon table 20 begins to move upward, carrying the assembly thereon toward the squeeze-head 36. The table continues upward until the squeeze-board 144 on the sand in the cope flask engages the squeeze-head 36 and the sand is squeezed. See Fig. 9.

When the pressure in the table raising cylinder 10 reaches a predetermined value, calculated to give the sand the proper amount of squeeze, a pressure switch 152 (shown in Figs. 16 and 17) trips, simultaneously closing the supply of pressure to the table raising cylinder 10 and exhausting the pressure therefrom. Consequently the weight of the table 20 and the assembly thereon carries the table back to its "down" position.

Near the end of the downward movement of the table a pad 154a adjustably mounted on a rod 154 depending from the back edge of table 20 trips a table-down limit switch 156, and as a result of this switch being tripped fluid pressure is admitted to cylinder 38 causing the squeeze-head 36 to swing from its "forward" position above table 20 to its "back" position. See Fig. 10.

Near the end of the backward swing of the squeeze-head a projection 30b on the upstanding arm 30 of the squeeze-head linkage trips a head-back limit switch 158 and as a result of this switch being tripped fluid pressure is admitted to the table raising cylinder 10. Consequently the table 20 again moves upward.

This time, however, the upward movement of the table is not limited by the squeeze-board 144 on the sand in the cope flask engaging the squeeze-head 36 because the squeeze-head is in its "back" position, and the table 20 travels to the top of its stroke tripping a table-up limit switch 160 which is engaged by a pad 162a adjustably mounted on a second rod 162 depending from the back of table 20. As a result of this latter switch being tripped fluid pressure is admitted to cylinders 56 causing the clamping legs 50 to move inward toward table 20 until the open rotatable jaws 124 are in a position to grab the ends of the two squeeze-boards 142 and 144 when the rotatable jaws are closed.

Near the end of the inward swing of each of the clamping legs 50 a bar 50d fastened to each leg trips a clamping-leg-in limit switch 164, and when both of these clamping-leg-in limit switches are tripped fluid pressure is admitted to chambers 68b in both roll-over clamping heads C causing the rotatable jaws 124 to close and grab the assembly on the table. See Fig. 11.

When the pressure in both chambers 68b reaches a predetermined value calculated to assure proper gripping by the rotatable jaws, two additional pressure switches 166 and 168 (shown in Figs. 16 and 17) are tripped, and as a result of these pressure switches being tripped fluid pressure is exhausted from the table raising cylinder 10. Consequently the weight of table 20 and the assembly thereon carries the table to its "down" position.

Near the end of the table's downward movement table pad 154a again trips table-down limit switch 156, and as a result of this switch being tripped fluid pressure is admitted to cylinders 128 which turn the roll-over clamping heads C 180°. See Fig. 12. The rotatable jaws 124 are hinged on these clamping heads and hence the assembly of flasks are likewise rotated 180°. The drag flask 114 is now uppermost. The squeezed sand in flasks is not disturbed and cannot fall out during this roll-over operation because the rotatable jaws grip the squeeze-boards which bear against the sand only. This arrangement has the advantage that special clamps are not necessary to hold the two flasks together.

Near the end of 180° rotation of the roll-over clamping head C a roll-over limit switch 170 mounted on the front of one of the legs 50 is tripped by a stop 172a mounted on a vertically disposed rod 172 the upper end of which is pivotally secured to segment gear hub 132a, and as a result of this switch being tripped fluid pressure is admitted to the table raising cylinder 10 to bring table 20 back up to its "up" position to support the weight of the now-turned-over assembly of flasks and match plate. As the table 20 moves upward table-up limit switch 160 is again tripped, and the tripping of this latter switch causes fluid pressure to be introduced into chambers 68b in the roll-over clamping heads C to open the rotatable jaws 124. The assembly of flasks and match plate is then resting on table 20. In addition, the closing of table-up limit switch 160 causes fluid pressure to be admitted to cylinders 56 to swing clamping legs 50 outward from table 20 to their "out" position. See Fig. 13.

As the clamping legs 50 reach the end of their outward swing the bar 50d associated with each trips a clamping-leg-out limit switch 174, and as a result of these switches being tripped fluid pressure is exhausted from the table raising cylinder 10. Thereupon on the weight of table 20 and the assembly thereon returns the table to its "down" position. This completes the machine cycle.

After this series of operations by the machine both flasks are completed, the sand in the drag flask 114 having been hand-tamped, as described, and the sand in the cope flask 116 having been squeezed by the machine. Furthermore the assembly of flasks and match plate had been turned over by the machine, so that as it rests on the table 20—now in its "down" position—the drag flasks 114 is uppermost.

The purpose of vibrator 106 is to loosen any sand in the flasks which may tend to stick to the surface of the match plate. The operator turns on this vibrator and lifts the drag flask 114 off the match plate. He then turns this drag flask over, holding its squeeze-board 142 in place, and rests the unit on a bench with its squeeze-board underneath. See Fig. 14. This squeeze-board serves as a platform on which the mold rests when it is put on a conveyor and when the mold is poured.

The match plate 112 is still resting on the cope flask 116 on the table 20. The operator places a new empty drag flask 114' in position thereon. Sand is then poured into this new drag flask and a new squeeze-board 142' placed on top. See Fig. 15. Again the operator pushes the squeeze-roll button 146 and the machine performs the operations just described. This time, however, near the end of the 180° roll-over of the roll-over clamping heads C a different roll-over limit switch is tripped. In the previous cycle, the segment gear 132, upon turning effects pivoting movement of hub 132a in a downward direction, the stop 172a carried on rod 172 thereby tripping switch 170. In the cycle now being described, segment gear 132 turns in an opposite direction effecting pivoting movement of hub 132a in an upward direction thereby causing a second stop 172b carried on rod 172 to trip another roll-over limit switch 176 to effect the raising of table 20.

When this second machine cycle is completed the finished cope flask 116 is uppermost on the table, and this cope is then drawn by the operator and set upon the drag finished earlier thus completing a mold. Thereupon a new cope flask is placed on the match plate, filled with sand and so on.

There are undoubtedly a number of possible electrical control systems which could be associated with my improved machine to provide the sequence of operations I have described above. I have found, however, that the system shown diagrammatically in Fig. 16 is particularly well suited for my purposes because it is relatively simple and employs throughout standard items of electrical equipment.

Figure 16:
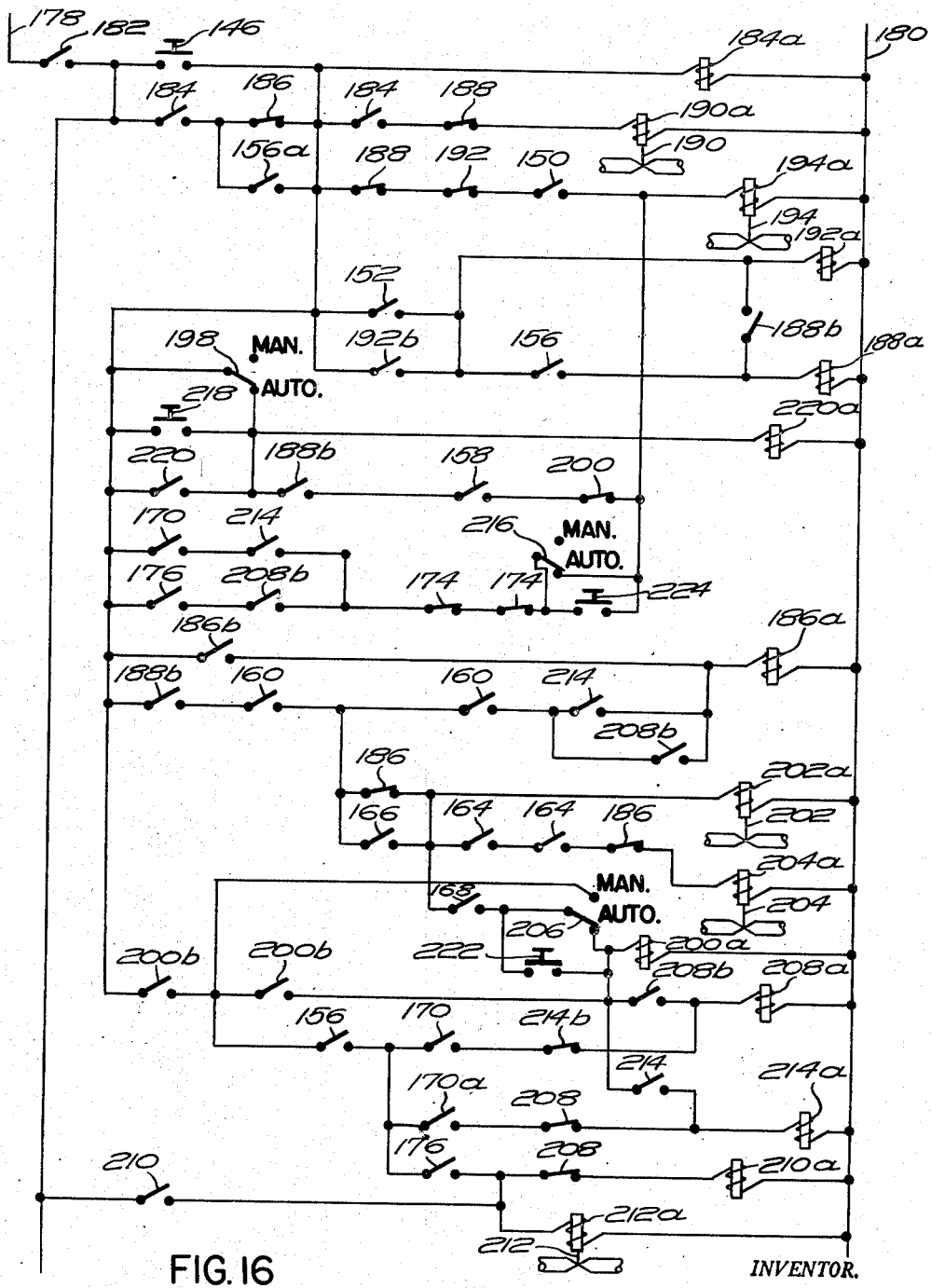
Figure 16 is an elementary wiring diagram of an electrical control system which may be employed with my improved machine.

In some instances, switches bearing the same designating number are shown at several different locations in this Fig. 16. This has been done to facilitate understanding of the diagram. It will be understood that in an actual device only one switch is required for all of those similarly designated. Operation of this system will be clear to those skilled in the art with the following description.

Main leads 178 and 180 brings power to the circuit from a source (not shown). Switch 182 provides means for shutting off this power when the machine is not in use.

Figure 8:
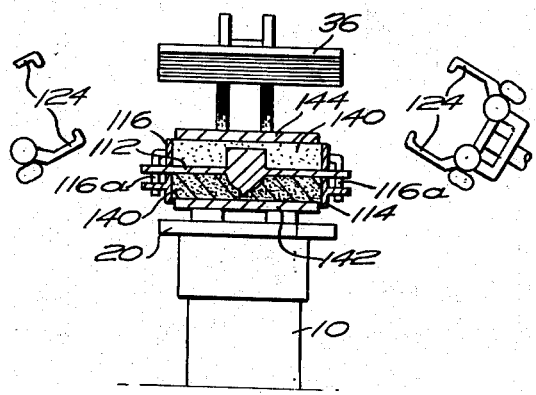
Figure 8 is a diagram showing the cope flask filled with sand.
Figure 11:
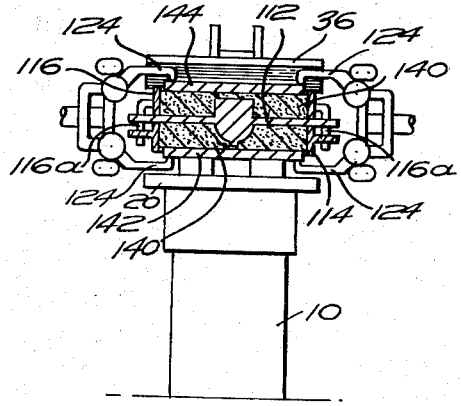
Figure 11 is a diagram showing the table raised, the clamping legs swung in toward the table and the jaws closed on the ends of the squeeze-boards.
Figure 9:
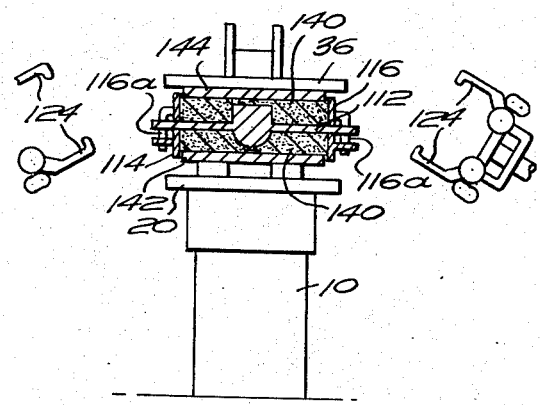
Figure 9 is a diagram showing the squeeze top swung forward and the table raised to squeeze the sand in the cope flask.
Figure 12:
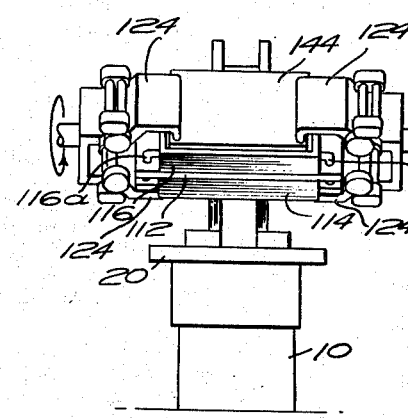
Figure 12 is a diagram showing the table lowered and the clamping heads A turning over the flasks.
Figure 14:
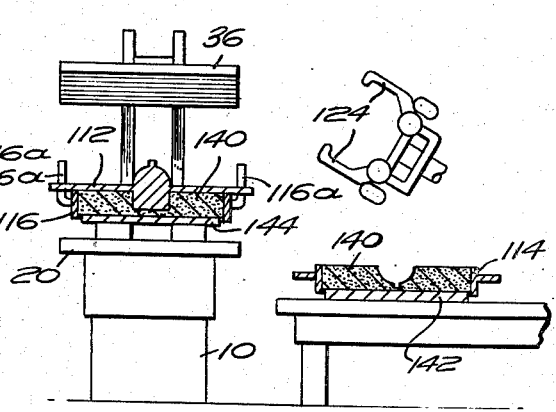
Figure 14 is a diagram showing the clamping legs swung back, the table lowered and the finished drag removed and placed on a nearby bench.
Figure 13:
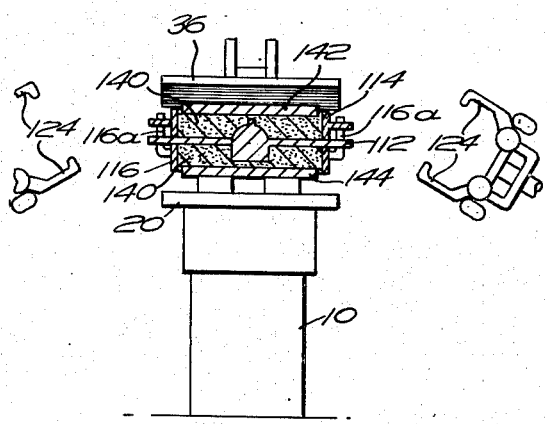
Figure 13 is a diagram showing the flasks turned completely over so that the drag flask is on top, the table raised and the jaws opened.
Figure 15:
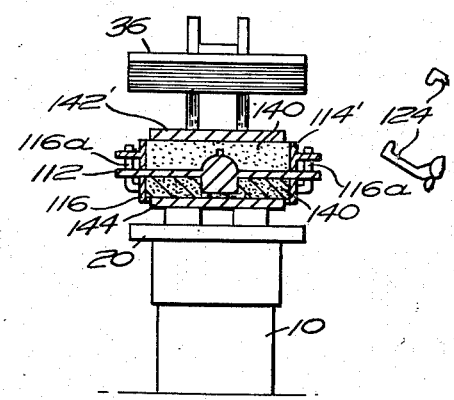
Figure 15 is a diagram showing a new drag flask placed in position on the match plate, filled with sand and ready for the same squeeze and roll over which will put the finished cope uppermost.

Assume switch 132 is closed and the assembly of flasks and match plate on the table 20 is as shown in Fig. 8. The operator is then ready to start the machine cycle. Pressing the "squeeze-roll" button switch 146 completes a circuit between leads 178 and 180 comprising the button switch 146 and the windings 184a of a normally-open relay-operated switch 184. The latter switch promptly closes and maintains itself closed through a circuit comprising the switch 184, a normally-closed relay-operated switch 186 and the windings 184a of the switch 184. (When reference is made herein to "normally-open" relay-operated switches what is meant is that these switches are open when no current is flowing through their relay windings; and, likewise, when reference is made to "normally-closed" relay-operated switches what is meant is that these switches are closed when no current is flowing through their windings.) Because relay-operated switch 184 is self-sustaining the operator may remove his finger from button switch 146 immediately after pressing it.

In addition to the circuit including relay windings 184a another circuit is completed by the closing of switch 184 which circuit comprises switch 184, switch 186, switch 184 again, a normally-closed relay-operated switch 188 and the windings 190a of a relay-operated two-way valve 190 located in the fluid pressure line leading to the cylinder 38. This valve is so arranged that current in its relay windings 190a positions the valve so that fluid pressure is admitted to cylinder 38 to swing the squeeze-head 36 forward, and, conversely, deenergizing windings 190a positions the valve 190 so as to cause the squeeze-head to be swung back.

Since the last-described completed circuit includes the relay windings 190a of valve 190 current flows through them, and squeeze-head 36 swings to its forward position, closing head forward limit switch 150. This completes another circuit comprising switch 184, switch 186, switch 188, a normally-closed relay-operated switch 192, head forward limit switch 150, and the relay windings 194a of a relay-operated one-way valve 194 located in the fluid pressure line leading to the squeeze cylinder 10. This valve 194 is so arranged that current in its relay windings 194a causes the valve to open, and, reversely, when the current stops the valve closes. Since current flows in windings 194a when head forward limit switch 150 is closed fluid pressure is admitted to squeeze cylinder 10 to raise the table 20 and squeeze the sand in the flasks thereon.

When the fluid pressure in cylinder 10 reaches a predetermined value, calculated to give the sand the proper amount of squeeze, the pressure switch 152 closes completing a circuit comprising switch 184, switch 186, pressure switch 152 and the relay windings 192a of the normally-closed relay-operated switch 192. The completion of this circuit opens the normally-closed switch 192 and stops the flow of current through the relay windings 194a of the relay-operated valve 194. Thereupon, fluid pressure being supplied to the squeeze cylinder 10 is stopped by the closing of valve 194; fluid pressure is exhausted from squeeze cylinder 10, and table 20 starts to come down again.

In addition to opening normally-closed switch 192, the passage of current through relay windings 192a closes a normally-open switch 192b also associated with these windings. Closing this latter switch completes a circuit comprising switch 184, switch 186, switch 192b and relay windings 192a, so that when exhaustion of fluid pressure from squeeze cylinder 10 permits pressure switch 152 to reopen current will still flow through relay windings 192a.

As the downward moving table 20 nears its lowermost position the pad 154a secured to the depending rod 154 engages and closes table down limit switch 156. This completes a circuit comprising switch 184, switch 186, switch 192b, table down limit switch 156 and the relay windings 188a of normally-closed switch 188. Current through these relay windings 188a causes switch 188 to open, whereupon current ceases to flow in the relay windings 190a of valve 190. As a result this latter valve operates to cause the squeeze-head 36 to swing back from its position above the table.

As the squeeze-head 36 nears the end of its backward swing, projection 30b on arm 30 engages and closes head-back limit switch 158. This completes a circuit comprising switch 184, switch 186, a selector switch 198 positioned for "automatic" operation, a normally-open relay-operated switch 188b which was closed when current flowed through the relay windings 188a, head back limit switch 158, a normally closed relay-operated switch 200 and the relay windings 194a of valve 194. Current passing through these windings 194a upon completion of this last mentioned circuit so positions valve 194 that fluid pressure is admitted to squeeze-cylinder 10 to bring the table 20 up again.

Upward movement of table 20 reopens table-down limit switch 156, but the relay windings 188a remain energized because the normally-open switch 188b is closed. Closing of this switch 188b permits current to by-pass table-down limit switch 156. Thus more particularly, the circuit maintaining relay windings 188a energized comprises switch 184, switch 186, switch 192b, switch 188b and relay windings 188a.

As the upward moving table 20 nears the upper end of its travel, pad 162a on depending rod 162 engages and closes table-up limit switch 160. Closing this latter switch completes a circuit comprising switch 184, switch 186, switch 188b, table-up limit switch 160, switch 186 again and the relay windings 202a of a relay-operated two-way valve 202 associated with the cylinders 56 which move the clamping legs 50. This valve 202 is so arranged that current in its relay windings 202a positions the valve so that fluid pressure is admitted to cylinders 56 to swing the clamping legs 50 toward the table 20, and, reversely, deenergizing windings 202a positions the valve 202 so as to cause the clamping legs to swing away from the table. Upon completion of the circuit last-described the clamping legs begin to swing inward.

As the clamping legs 50 reach the limit of their inward swings, bars 50d secured to these legs engage and close clamping-leg-in limit switches 164, and when both of these latter switches are thus closed a circuit is completed comprising switch 184, switch 186, switch 188b, switch 160, switch 186 again, clamping-leg-in limit switches 164, switch 186 yet again and the relay windings 204a of a relay-operated two-way valve 204 associated with the roll-over clamping heads C. This valve 204 is so arranged that current in its relay windings 204a positions the valve so that fluid pressure is admitted to cylinder 68 to close the clamping jaws 124, and, reversely, deenergizing windings 204a positions the valve 204 so as to cause these clamping jaws to open. Upon completion of the circuit last described the jaws close.

When the fluid pressure which closes the clamping jaws 124 reaches a predetermined value, calculated to insure that the assembly on the table 20 is properly gripped, pressure switches 166 and 168 close and complete a circuit comprising switch 184, switch 186, switch 188b, switch 160, pressure switch 166, pressure switch 168, a selector switch 206 positioned on "automatic" and the relay windings 200a of normally-closed relay-operated switch 200. Energizing the relay windings 200a in this fashion opens normally-closed switch 200 and thus stops the flow of current in relay winding 194a of valve 194. As a consequence, valve 194 is positioned so as to exhaust fluid pressure from squeeze cylinder 10, and table 20 comes down to its lowermost position. Simultaneously the energizing of relay windings 200a closes a switch 200b so that windings 200a are held energized by a separate circuit comprising switch 184, switch 186, switch 200b, switch 200b again and relay windings 200a.

As the table 20 nears the end of its downward movement it again engages and closes table-down limit switch 156 and completes a circuit comprising switch 184, switch 186, switch 200b, table down limit switch 156, roll-over limit switch 176 which is held closed by stop 172b mounted on rod 172, a normally-closed relay-operated switch 208 and the relay windings 210a of a normally-open relay-operated switch 210. Current through these relay windings 210a closes switch 210 and completes a circuit comprising switch 210 and the relay windings 212a of a relay-operated two-way valve 212 associated with the roll-over cylinder 128. This valve 212 is so arranged that current in its relay windings 212a positions it so that fluid pressure is admitted to cylinders 128 to rotate the clamping heads C in one direction, and, reversely, deenergizing relay windings 212a positions valve 212 so as to cause the clamping heads to rotate back again in the opposite direction.

The closing of table-down limit switch 156 not only completes a circuit which ultimately causes relay windings 212a to be energized; it also completes another circuit comprising switch 184, switch 186, switch 200b, switch 156, a second roll-over limit switch 170a which is contained in the same housing as switch 170 and which is closed when not engaged by stop 172a on rod 172, the normally-closed relay-operated switch 208 and the relay windings 214a of relay-operated switch 214. This completed circuit closes switch 214.

Since the closing of table down limit switch 156 energizes relay windings 212a of valve 212 the clamping heads C are rolled-over, and as they near the end of their 180° rotation stop 172a on rod 172 engages and closes roll-over limit switch 170 housed in the same casing with roll-over limit switch 170a. The closing of this switch 170 completes a circuit comprising switch 184, switch 186, switch 170, switch 214, both clamping-leg-out limit switches 174 which are closed when not tripped, a selector switch 216 positioned on "automatic" and the relay windings 194a of relay-operated valve 194. This completed circuit causes the table 20 to come up again.

The energizing of the relay windings 214a, as already described, not only closes the normally-open switch 214, it also opens a normally-closed switch 214b. Furthermore, the closing of switch 214 maintains relay windings 214a energized through a circuit comprising switch 184, switch 186, switch 200b, switch 200b again, switch 214 and relay windings 214a.

As the upward moving table 20 nears the upper limit of its travel, pad 162a carried on rod 162 once again engages and closes table-up limit switch 160, and the closing of this latter switch completes a circuit comprising switch 184, switch 186, switch 188b, table-up limit switch 160, switch 160 again, switch 214 and the relay windings 186a of relay-operated switch 186. Energizing of relay windings 186a in this fashion opens switch 186 and stops the flow of current through relay windings 204a of valve 204. Since pressure-operated switches 166 and 168 are in parallel with open switch 186 insofar as relay windings 202a of valve 202 are concerned, current can still flow to relay windings 202a from either of the now closed pressure-switches. However, clamping jaws 124 open as a consequence of de-energizing relay windings 204a of valve 204, and when the fluid pressure which held these jaws closed is sufficiently reduced pressure operated switches 166 and 168 open and stop the flow of current through relay windings 202a of valve 202. This causes clamping legs 50 to swing away from the table 20.

Energizing relay windings 186a not only opens relay switch 186, it also closes a normally-open switch 186b operated by the same relay 186a. As a result of switch 186b closing relay winding 186a are maintained energized by a completed circuit comprising switch 184, a table-down limit switch 156a which is contained in the same housing with table-down limit switch 156 and which is closed when not tripped, switch 186b and the relay windings 186a. With this arrangement once relay windings 186a are energized they are maintained energized to the end of the machine cycle regardless of the position of table-up-limit switch 160.

As the clamping legs near the end of their outward swing the bar 50d on each engages and opens its associated clamping-leg-out limit switch 174 and the flow of current through relay windings 194a of valve 194 is stopped. As a result, the table 20 starts to move down once more, and when the table nears the end of its downward movement it trips and opens normally-closed table-down limit switch 156a. Since switch 186 is also open at this point all circuits between leads 178 and 180 are broken, and the machine cycle is completed. The sand in the flasks has been squeezed and the assembly of flasks and match plate has been turned over on the table. The operator then removes the uppermost flask from the assembly, sets it aside and replaces it with an empty flask. This latter flask he then fills with sand and provides a squeeze-board therefor.

When the operator next presses the squeeze-roll button the electrical control circuits behave in the same manner as above described until the point is reached where the clamping heads C are ready to roll over. Just prior to this point the table 20 was moving downward, and when it reaches the lower limit of its travel pad 154a carried on rod 154 engages and closes table-down limit switch 156. This time the closing of this latter switch completes a circuit comprising switch 184, switch 186, switch 200b, switch 156, switch 170 which was closed at the end of the previous cycle, normally-closed switch 214b and the relay windings 208a of normally-closed relay-operated switch 208. Completion of this circuit also closes a normally-open switch 208b associated with the relay windings 208a and these windings 208a are thereafter maintained energized by a completed circuit comprising switch 184, switch 186, switch 200b, switch 200b again, switch 208b and relay windings 208a.

In addition to closing switch 208b, energizing of relay windings 208a opens the normally-closed switch 208, as has been noted, and the opening of this switch 208 stops the flow of current through relay windings 210a of switch 210. As a consequence switch 210 opens, windings 212a of valve 212 are deenergized and fluid pressure is admitted to roll-over cylinders 128 to rotate the clamping heads C back again 180°.

As the clamping heads reach the end of this last-mentioned rotation the stop 172b carried on rod 172 again engages and closes roll-over limit switch 176, and the closing of this latter switch completes a circuit comprising switch 184, switch 186, roll-over limit switch 176, switch 208b, clamping-leg-out limit switches 174 which are closed when not tripped, selector switch 216 positioned on "automatic" and the relay windings 194a of valve 194. Current through these relay windings 194a positions valve 194 so that table 20 starts to come up, and when it reaches the upper limit of its travel pad 162a carried on rod 162 engages and closes table-up-limit switch 160. Closing this switch 160 completes a circuit comprising switch 184, switch 186, switch 188b, switch 160, switch 160 again, switch 208b and relay windings 186a of switch 186.

Current through these relay windings 186a causes switch 186 to open and thus deenergizes relay windings 204a of valve 204, whereupon clamping jaws 124 open as before, and when the fluid pressure which held these jaws closed is sufficiently reduced pressure valves 166 and 168 open and stop the flow of current through relay windings 202a of valve 202, as above described. Consequently valve 202 is positioned so that the clamping legs 50 swing away from the table 20.

When these clamping legs near the end of their outward swing the bar 50d on each engages and opens its associated clamping-leg-out limit switch 174, and the opening of these latter switches deenergizes relay windings 194a of valve 194. As a result the table starts down again, and when it reaches the lower end of its travel it engages and opens table-down limit switch 156a. Since switch 186 is open at this point, opening switch 156a breaks all the circuits between leads 178 and 180 and again the machine cycle is completed. The sand in the flasks has again been squeezed and the assembly of flasks and match plate again turned over on the table.

The operator removes the uppermost flask from the assembly, sets it on the previously set aside flask to form a completed mold, and replaces it with an empty flask. This latter flask he then fills with sand, and so on.

It will be seen from Fig. 16 that there are a number of switches and a relay which have not thus far been described. These switches and relays are provided so that if the operator wishes he can accomplish the full machine cycle one step at a time, pushing a button for each step.

Thus assume that such intermittent operation is desired. First of all the operator positions each of the selector switches 198, 206 and 216 on "manual." Next he pushes button switch 146. The squeeze-head 36 will come forward, the table 20 will come up and squeeze the sand in the flasks, the table will go down again and the squeeze-head will swing back. Nothing further will happen because selector switch 198 is positioned on "manual."

Next the operator must push a button switch 218. This energizes the relay windings 220a of a normally-open relay-operated switch 220 and the consequent closing of this switch 220 maintains relay windings 220a energized. In addition, closing of switch 220 completes a circuit by-passing selector switch 198 and the following operations result: The table 20 comes up; the clamping legs 50 swing in toward the table; and the jaws close to grip the assembly of flasks and match plate. Nothing further will happen because selector switch 206 is positioned on "manual."

Next the operator must push a button switch 222. This energizes the relay windings 208a of switches 200 and 200b and the following operations result: The table 20 moves to its down position, and the assembly of flasks and match plate is turned over. Nothing further will happen because selector switch 216 is positioned on "manual."

Next the operator must push a button switch 224. This completes a circuit energizing the windings 194a of relay valve 194 and the following operations result: The table 20 moves to its up position; the jaws 124 open; the clamping legs 50 swing away from the table; and the table moves to its down position.

Figure 17:
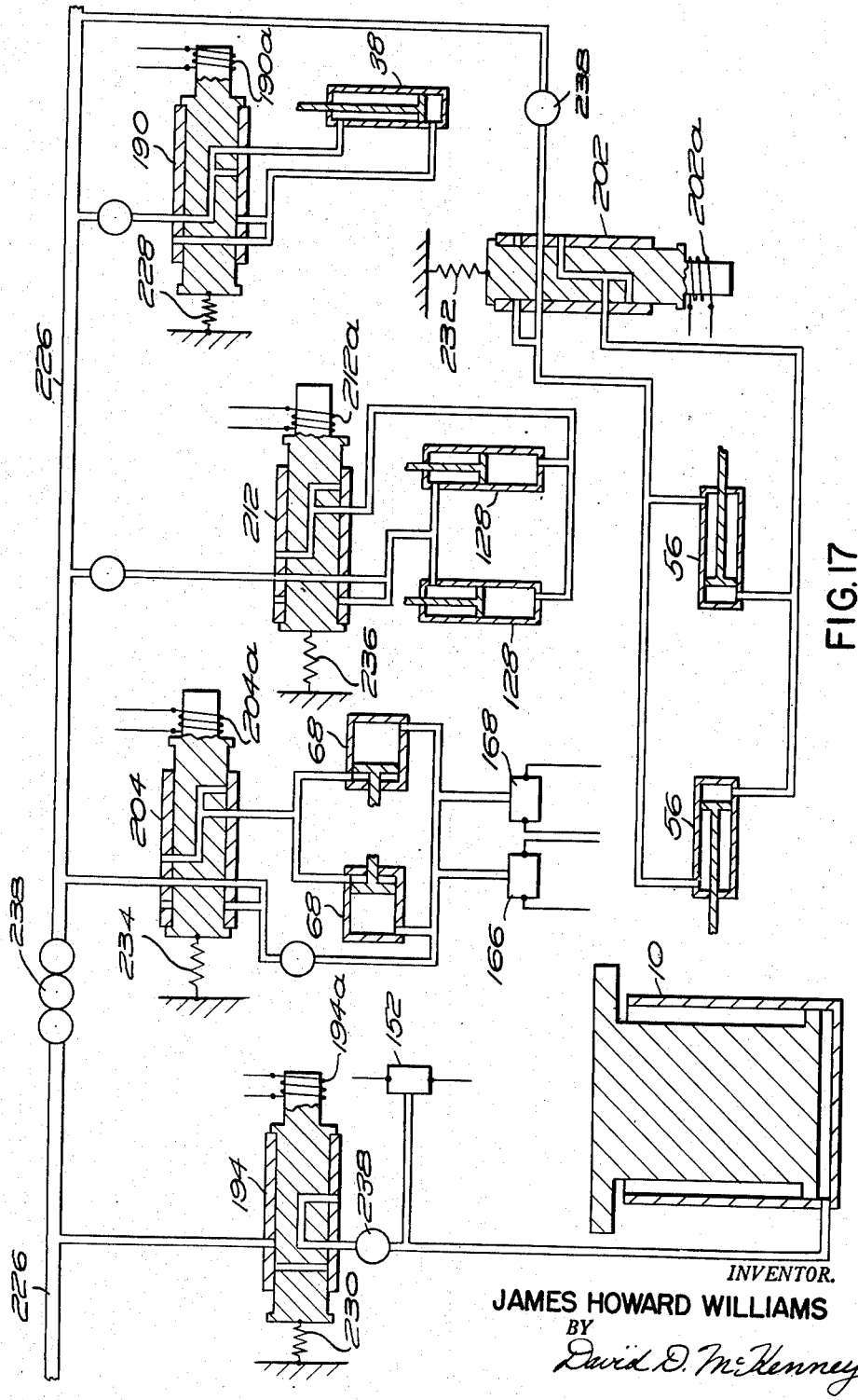
Figure 17 is an elementary piping diagram of a fluid control system which may be employed with my improved machine.

Just as there are a number of electrical control systems which may be employed with my improved machine, there are undoubtedly a number of fluid pressure control systems that could be used. I have found, however, that the fluid pressure control system shown diagrammatically in Fig. 17 is particularly well suited for association with the electrical control system of Fig. 16. The various parts of the machine fragmentarily shown in Fig. 17 are in the positions they assume when the cycle has progressed to the stage shown in Fig. 12.

Referring now more particularly to Fig. 17 fluid (normally air) under pressure is brought to the machine along a supply pipe 226 from a source (not shown). From pipe 226, fluid pressure is led off to the relay-operated valves 190, 194, 202, 204 and 212 and thence to the various cylinders. As has been previously noted, each of these relay-operated valves assumes a definite position when no current is flowing in its relay windings. This position is achieved in valve 190 by spring means 228, in valve 194 by spring means 230, in valve 202 by spring means 232, in valve 204 by spring means 234 and in valve 212 by spring means 236. Speed controllers 238 are located throughout to prevent too rapid movement of the movable parts.

I claim:

1. A machine for making molds which comprises a movable table for supporting flasks, a squeeze-head movable into cooperative relation with said table, means for moving said squeeze-head, means for moving said table toward said squeeze-head to apply pressure to the contents of said flasks, rotatable clamping jaws located on opposite sides of said table and movable thereetoward, means for moving said jaws toward said table, means for closing said jaws to grip said flasks and means for rotating said jaws with said flasks gripped therebetween.

2. A machine for making two-part molds by the match plate method which machine comprises a vertically movable table for supporting a match plate and any flasks and squeeze-boards assembled therewith, a squeeze-head movable into a position above said table, means for moving said squeeze-head, means for raising said table toward said squeeze-head when said match plate, flasks and squeeze-boards are completely assembled to press the contents of the flasks between said match plate and said squeeze-boards, rotatable clamping jaws located on opposite sides of said table and movable theretoward, means for moving said jaws toward the flasks resting on said table, means for closing said jaws against said squeeze-boards and means for rotating said jaws to invert the flasks on said table.

3. A machine for making two-part sand molds by the match plate method which machine comprises a vertically movable table for supporting two flasks which are assembled thereon one above the other with a match plate between them, a squeeze-head movable into a position above said table, means for moving said squeeze-head into said position above said table, means for raising said table toward said squeeze-head until an upper squeeze-board located on top of the uppermost flask engages said squeeze-head and by said engagement tightly packs the contents of both said flasks, means for lowering said table, means for moving said squeeze-head from said position above said table, rotatable clamping jaws located on opposite sides of said table and movable theretoward, means for holding said jaws open, means for moving said open jaws toward said table so that when said table has been raised a predetermined distance by said table-raising means said open jaws embrace the opposite ends of the assembly of flasks and match plate, means for closing said jaws until each bars against said upper squeeze-board and against a lower squeeze-board on which the lowermost flask rests, means for rotating said jaws to invert said flasks when said table has been lowered by said table-lowering means, and means to open said jaws and additional means to move said jaws away from said table when said table has been raised by said table-raising means to support said inverted flasks.

4. A machine for producing two-part sand molds with a match plate which machine comprises a vertically movable table for supporting a cope flask and a drag flask assembled thereon one above the other with said match plate between them, a squeeze-head movable into a position above said table, means for moving said squeeze-head into said position above said table, means for raising said table toward said squeeze-head until an upper squeeze-board resting on the contents of the uppermost flask engages said squeeze-head, said engagement tightly packing the contents of said uppermost flask between said upper squeeze-board and said match plate and in addition tightly packing the contents of said lowermost flask between said match plate and a lower squeeze-board on which said lowermost flask rests, means for lowering said table, means for moving said squeeze-head from said position above said table, movable frame members located on opposite sides of said table, clamping jaws rotatably mounted on said movable frame members, means for holding said clamping jaws open, means for moving said movable frame members toward said table so that when said table has been raised a predetermined distance by said table-raising means said open clamping jaws extend around the opposite ends of said assembled flasks, means for closing said clamping jaws until one jaw piece of each engages the upper surface of said upper squeeze-board and the other jaw piece of each engages the lower surface of said lower squeeze-board, means for rotating said clamping jaws 180° to invert said flasks when said table has been lowered by said table-lowering means, and means for opening said clamping jaws and additional means for moving said movable frame members away from said table when said table has been raised by said table-raising means to support said inverted flasks.

5. A machine for producing two-part sand molds by the match plate method which machine comprises a vertically movable table for supporting certain elements which form no part of this machine, more particularly a cope flask and a drag flask which may be manually assembled on said table one above the other with said match plate between them preparatory to the operation of said machine, said lowermost flask having been filled with sand and resting on a lower squeeze-board which in turn rests on said table and said uppermost flask also having been filled with sand and having an upper squeeze-board resting thereon, a squeeze-head movable into a position above said table, means for moving said squeeze-head into said position above said table, means for raising said table toward said squeeze-head until said upper squeeze-board engages said squeeze-head to pack the sand in the flasks between their respective squeeze-boards and said match plate, means for lowering said table, means for moving said squeeze-head from said position above said table, frame members located on opposite sides of said table and having their lower ends pivoted near the base thereof so that the upper ends of said frame members can swing toward and away from said table, clamping jaws rotatably mounted in said upper ends of said frame members so that said clamping jaws have a common axis of rotation when said frame members are swung toward said table, means for holding the jaw pieces of said clamping jaws open, means for swinging said upper ends of said pivoted frame members toward said table so that when said table has been raised a pretetermined distance by said table-raising means one jaw piece in each said clamping jaw is positioned above an end of said upper squeeze-board and the other jaw piece in each said clamping jaw is positioned below an end of said lower squeeze-board, means for closing said clamping jaws until said jaw pieces of each bear firmly against said squeeze-board ends, means for rotating said clamping jaws 180° to invert said flasks held thereby when said table has been lowered by said table-lowering means, and means for opening said clamping jaws and additional means for swinging said upper ends of said frame members away from said table when said table has been raised by said table-raising means to support said inverted flasks.

References Cited in the file of this patent

UNITED STATES PATENTS

| Number | Name | Date |
|---|---|---|
| 397,316 | Teetor | Feb. 5, 1889 |
| 607,152 | Wiman | July 12, 1898 |
| 1,220,725 | Carman | May 27, 1917 |